United States Patent [19]

Wolf

[11] 4,148,408
[45] Apr. 10, 1979

[54] CAPACITOR CLOSURE DISC AND METHOD FOR MAKING SAME

[75] Inventor: Franz-Josef Wolf, Bad Soden-Salmünster, Fed. Rep. of Germany

[73] Assignee: WOCO Franz-Josef Wolf & Co., Soden-Salmünster, Fed. Rep. of Germany

[21] Appl. No.: 896,054

[22] Filed: Apr. 13, 1978

[30] Foreign Application Priority Data

Apr. 23, 1977 [DE] Fed. Rep. of Germany ....... 2718228

[51] Int. Cl.² .................. B65D 35/44; B65D 43/00; B65D 51/00
[52] U.S. Cl. ................................ 220/200; 29/25.41; 29/570; 220/DIG. 19
[58] Field of Search ............... 220/200, 307, DIG. 19; 29/25.41, 570

[56] References Cited

U.S. PATENT DOCUMENTS 3,722,730  3/1973  Joos .................. 220/200 X

*Primary Examiner*—George T. Hall
*Attorney, Agent, or Firm*—Burns, Doane, Swecker & Mathis

[57] ABSTRACT

A capacitor closure disc unit comprises a metallic plate and a layer of rubber-elastic insulating material injection-molded around its periphery. The plate is dish shaped and includes a flat flange. The recessed central part of the plate forms a centering area which, through the help of centering projections, aids in centering the plate in a mold cavity. The outer surface of the recessed portion can be very slightly concave so that contact thereof with a planar mold section forms a circular edge seal during the injection-molding step.

13 Claims, 3 Drawing Figures

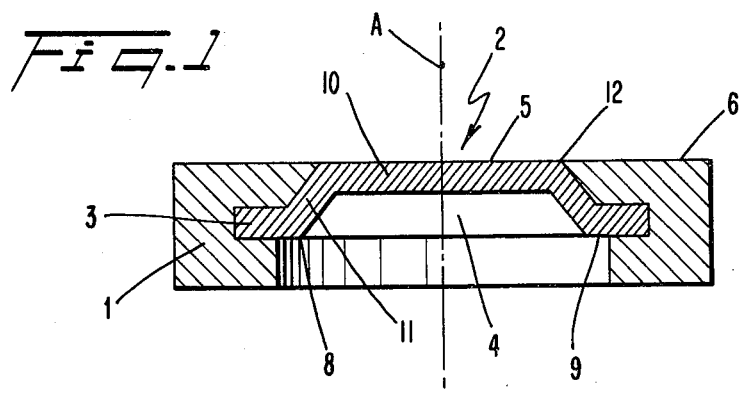
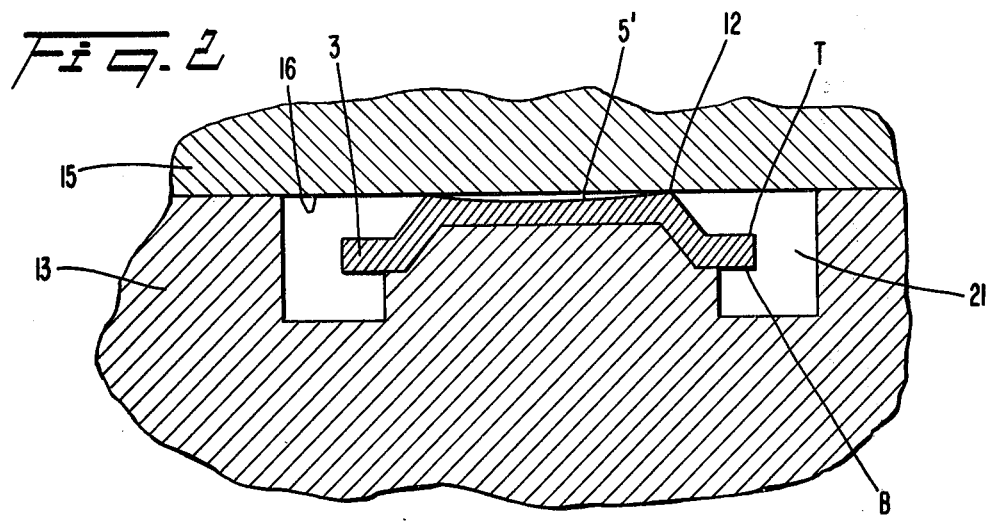
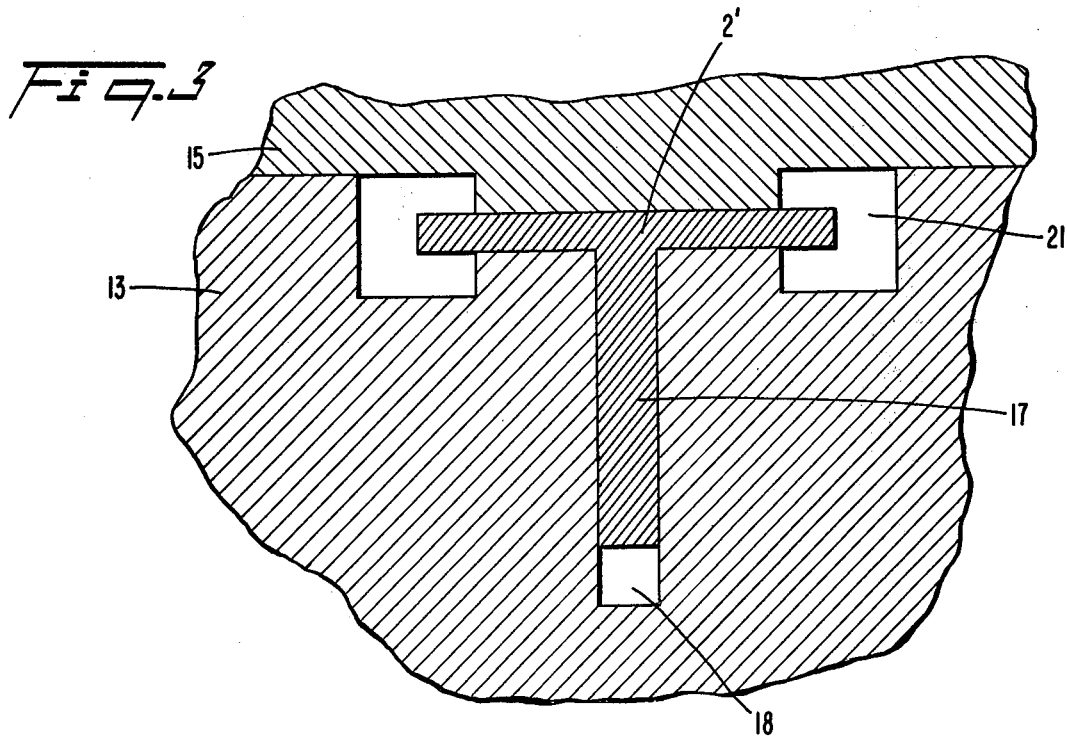

CAPACITOR CLOSURE DISC AND METHOD FOR MAKING SAME

BACKGROUND AND OBJECTS OF INVENTION

The invention concerns a capacitor closure disc unit of a type comprising a metal plate encircled by a rubber sealing material.

Such capacitor closure disc usually consists of aluminum and serves to close off condenser housings which in most cases are also made of aluminum. The sealing rubber element which encircles the outer rim of the cover plate serves firstly as a gas-proof and liquid-proof seal between the plate and case housing and secondly to insulate electrically the plate from the case housing. The base of the mostly wound-up type of the capacitive unit inserted in the housing, usually has one of its terminals connected to the housing, and the other connected to the cover plate.

Such a capacitor closure disc is known from the disclosure of Swedish Published Patent Application No. 314 743. Its sealing rubber element is a prefabricated, preshaped rubber part, especially of tubular section. The diameter of the tubular section in its unstressed state is smaller than the diameter of the metallic plate. The tubular section, after being stretched radially, is placed radially around the metallic plate. The closure unit, after being prepared in this manner, is inserted into the upper rim of the housing which is then closed off in the usual manner by rolling down its rim and forming a seam. This known capacitor closure disc or condenser cover plate has the disadvantage that the metallic plate and the sealing rubber element must be manufactured separately in the form of individual parts and thus require an additional processing step for their preassembly.

Although the above-described technique for closing-off cup capacitors has been widely known for almost ten years, the sealing rubber elements for the cover plates of such capacitors are still being produced in the form of prefabricated rubber parts despite the uneconomic assembly required by such parts. This is possibly due to the fact that a flat, parallel sided aluminum disc, generally used for closing-off such housings, is not suitable for the application of a rubber ring by injection molding techniques because of technical mold difficulties. As a result, even the mere possibility of applying sealing rubber elements to flat capacitor cover plates consisting of metal by an injection molding method has been beyond the scope of closing-off techniques taken into consideration by persons skilled in the art.

It is an object of the invention in view of this present state of the art to provide a capacitor closure disc which simplifies and thus reduces the costs of the closing-off of the capacitor housing.

It is another object of the present invention to provide a novel capacitor closure unit, and method for making, which enables the sealing material to be applied by injection molding.

It is a further object of the invention to provide a novel capacitor insulated plate wherein centering of the plate in a mold is facilitated.

BRIEF SUMMARY OF PREFERRED EMBODIMENTS OF THE INVENTION

The invention solves this problem by proposing a capacitor closure disc with a peripheral sealing material applied by injection molding.

The invention is based on the idea of applying the sealing rubber material at the periphery of the metallic plate in the necessary manner by means of injection-molding and to design the metallic plate specifically for this purpose, so that it will become suitable for the rubber injection molding technique, and that it will allow specifically a simple, reliable, and even fully automatic, centering and adjusting in an injection molding cavity. The corresponding injection mold usually is designed to contain a greater number of such cavities.

The metallic plate is formed with a central recessed or projecting portion which facilitates centering in an injection mold cavity to enable the insulating material to be injection-molded in place. The plate is dish-shaped and includes a base and an annular flange spaced longitudinally therefrom. The flange forms an anchor for retaining the plate in the injection-molded mass.

The metallic plate contains, as a preferred species, a recessed flat center in the form of a truncated part of a cone. In other words, it has the shape of a dish or flat pan with a flat flanged rim and a recessed center. At the time of the injection-molding step, the plate is placed, with its concave side facing downwardly, onto a complementary designed centering projection in the lower unit of the injection mold. The upper unit of the mold is preferably level or planar so that the separating plane or parting line of the mold unit will be located within the plane of the surface of the recessed center part at the convex side of the metallic plate. This central surface at the convex side of the plate forms, after assembly of the capacitor, the outer contact surface available for the making of electrical connections. The surface of the rubber seal located at this side has the form of an annulus, located within the same plane as the contact surface snugly surrounding said surface.

In order to make certain that during the injection of the rubber mass no material seeps into the space between the lower side of the upper unit of the mold and the upper side of the metallic plate in the central region between the mold and plate, the outer rim of the center area of the plate at the convex side should be formed in such manner that it will be sharply angular. Otherwise the rubber material will seep-by and the surface of the metallic plate, needed for purposes of electrical contact, will either be greatly reduced in size, or possibly completely covered by the rubber mass entering the area.

According to another embodiment of the invention, this central area of the dish-shaped metallic plate is curved concavely, preferably very slightly, at the convex side in cases where such sharply angular shaping of the rim of the center area at the convex side of the plate is not feasible or too costly. The maximum curvature of the area amounts preferably only to fractions of one millimeter and will hardly be visible. However, this concave curvature will have the effect that upon the closing of the injection-mold there will be produced between the bottom side of the upper unit of the mold and the upper side of the center area of the metallic plate an edge seal, and the heavy closing pressures of the mold will thus definitely prevent leakage of the rubber mass onto the central contact surface area at the convex side of the plate.

These problems of overflow can be eliminated at the bottom side of the plate in a simple manner by shifting the sealing boundary between the upper side of the lower unit of the mold and the bottom side of the metallic plate from the edge at the center recess to the plane surface of the lower side of the flanged rim of the plate. If necessary, a tiny annular ridge can be formed at this location in a manner known per se at the bottom side of the metallic plate for providing an edge sealing.

In another embodiment of the invention with metallic plate can form a single piece together with a mandrel for a spirally wound-up capacitive unit. In the case of this design, where the metallic plate forms one piece together with the mandrel for the capacitive unit, this mandrel can serve also as centering means for the plate within the injection-mold. If the centering projection is designed in this specific manner, the metallic plate could, if desired, have the completely flat shape which has been in general use. This centering means, formed as a projection onto the metallic plate, can then be inserted into a centering bore in the lower unit of the tool or mold, said bore or recess having a relatively wide clearance while the seal between the units of the tool and the plate surface can be accomplished without any difficulties at the flat plate surface as described above with reference to the bottom side of the plate.

THE DRAWING

Other objects and advantages of the present invention will become apparent from the following detailed description of a preferred embodiment thereof in conjunction with the accompanying drawings wherein like numerals designate like elements and in which:

FIG. 1 is a longitudinal sectional view of a capacitor closure disc unit according to the present invention after an insulating mass has been injection-molded onto a metallic plate, FIG. 2 is a view, in longitudinal section, depicting a step during fabrication of the closure disc unit wherein the plate is positioned in a mold cavity wherein the outer surface of the plate is concave, the concavity of which being exaggerated, and FIG. 3 is a longitudinal sectional view of another embodiment of the present invention wherein a mandrel for the capacitive unit is affixed to the plate and forms a centering projection.

DETAILED DESCRIPTION OF PREFERRED EMBODIMENTS OF THE INVENTION

FIG. 1 shows a species of the invention in axial cross-section. The capacitor closure disc unit illustrated in FIG. 1 comprises a circular sealing rubber element 1 which is injection-molded around the perimeter of a metallic plate 2 at its bottom side, upper side and radial outside. The metallic plate 2 has the form of a dish or flat pan with a flat, flange-like annular rim 3 and a cup-shaped or frusto-conical center part 4 which protrudes from the plane of the rim 3. The plate 2 thus has a concave side as viewed from within the capacitor housing not shown in the drawings (i.e., when viewed from beneath in FIG. 1), and a convex side as viewed from outside of the capacitor (i.e., from above in FIG. 1). The outer central surface 5 of the center part, located at the convex side of the metallic plate 2, forms a common plane with the outer annular face 6 of the injection-molded rubber seal 1. When the capacitor is closed-off, by the closure disc unit, the surface 5 serves as the outer terminal area. It is possible, for example, to solder a connecting wire directly to this surface.

The turned-over cup-shaped center part is symmetrical about its central longitudinal axis A and includes a cover portion 10 and an annular skirt 11. The junction of the outer central surface 5 of the cover portion 10 and skirt 11 form a sharp annular edge 12. The cover portion 10 is recessed axially from the plane of the flange 3.

Preparatory to the molding step, the plate 2 is inserted into the lower part 13 of an injection mold (FIG. 2) which contains a centering projection 14 that centers the plate in the cavity 21. This projection 14 engages laterally the inside wall of the skirt and on its top the inside wall of the cover portion 10 to properly center the plate 2. The upper part 15 of the mold has a planar bottom surface 16 which, when closed, engages the outer surface 5 of the cover portion 10 of the plate 2 which outer surface 5 lies flush in the parting face of the mold. Engagement between the axially sharp angular annular edge 12 and the surface 16 provides a sufficient seal against leakage of rubber material onto the outer surface 5 of the plate during the injection step. Thereafter, and by means of well known technology, an injection molding operation is carried out, wherein rubber material is injected into the cavity 21 of the mold 13, 15 around the top T and bottom B portions and the radial outer rim of the entire radial periphery of plate 2. Immediately after the step of injecting, the rubber composition is thermally cured when still kept in the mold.

In the event that it is not feasible or too costly to form a sharp edge 12 on the plate, the outer surface 5' of the center part 4 may be curved in a slightly convex form, that is, downwardly in case of FIG. 2, forming a raised annular edge 12. The concavity of the surface 5' is somewhat exaggerated in FIG. 2 and in actuality, will barely be visible and preferably will be in the order of magnitude of a fraction of one millimeter deep. When the mold is closed, the surface 16 of the upper part of the mold, will exert full closing pressure on the edge 12 to effect a proper seal. Thus, the edge 12 in this case also can be rounded, if desired. This specific shape of the annular edge 12 definitely prevents the rubber mass from flowing from the annular area of the mold cavity 21 into the region of the surface 5' when the sealing element 1 is formed in situ by injection molding.

At the bottom side of the metallic plate 2 (FIGS. 1 and 2), the rubber seal 1 does not extend all the way up to the annular edge 8 of the center recess 4 in the metallic plate 2, but terminates at some distance from this edge on the flat bottom side 9 of the rim 3 of the metallic plate 2. By such an arrangement, leakage of sealing material into the convex area of the plate is prevented in a more efficient manner.

In FIG. 3 an arrangement of the present invention is disclosed wherein the metallic plate 2' and the mandrel 17 for the spirally wound-up capacitive unit (not shown in the drawings) are integral. In this embodiment the plate 2' can be completely flat, since the mandrel 17 during the injection molding step serves as a centering projection received in a corresponding bore or recess (18) formed in the lower section (13) of the injection mold. In FIG. 3 the plate and mandrel unit is shown when inserted in a two-part injection mold 13, 15 immediately before injecting the rubber composition.

BRIEF SUMMARY OF MAJOR ADVANTAGES

The plate is axially recessed or projecting so that the plate includes a self-centering shape. This promotes applying of the sealing material 1 by an injection molding process, which has heretofore neither been feasible or, accordingly, been thought of.

The flange 3 aids in providing an anchor for retaining the plate within the insulating material body.

The provision of an edge 12 facilitates the establishment of a seal around the outer central surface 5 of the cover. The concave shape of the outer surface 5' (FIG. 2) enhances the sealing effect with or without a sharp edge.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A capacitor closure unit for sealingly closing-off a capacitor housing, the unit being of the type which includes a metal plate encircled along its periphery by sealing and electrically insulating material, the improvement wherein said plate includes a central, axially recessed or projecting portion which is symmetrical about the central longitudinal axis of the plate to facilitate centering of the plate within the cavity of an injection mold, and a coating of injection-molded sealing material encircling said plate peripheral to said recessed or projecting portion.

2. A capacitor closure unit according to claim 1, wherein said plate is of concave-convex configuration, and said sealing material is rubber.

3. A capacitor closure unit according to claim 1, wherein said plate comprises a central cover portion, a flat flange axially spaced from said cover portion, and a skirt interconnecting an outer edge of said cover portion with an inner edge of said flange.

4. A capacitor closure unit according to claim 3, wherein the junction of said cover portion and skirt forms a sharp circular outer edge.

5. A capacitor closure unit according to claim 3, wherein said annular skirt is frusto-conical, having its wider portion at said flange.

6. A capacitor closure unit according to claim 1, wherein said plate is turned-over dish-shaped and includes a flat flange axially spaced from said center recessed portion.

7. A capacitor closure unit according to claim 6, wherein said plate includes a base or cover portion, if seen in the turned-over position, having an outer surface on the convex side of said plate, said outer surface being of very slightly concave configuration when viewed from without, the depth of the concavity being in the order of magnitude of a fraction of one millimeter.

8. A capacitor closure unit according to claim 1, where said central projecting portion is formed as a mandrel for carrying a spirally wound-up capacitive unit.

9. A method of forming a capacitor closure unit for sealingly closing-off a capacitor housing comprising the steps of:
   providing a metallic plate having a central, axially recessed or projecting portion, which is symmetrical about the central longitudinal axis of the plate,
   positioning said plate within the mold cavity such that centering projections and recesses, respectively, of an injection mold disposed in said mold adjacent to said cavity serve to center said plate in said cavity, and
   injection-molding electrically insulative sealing material around the peripheral portion of said plate to embed said portion within a layer of electrically insulative material.

10. A method according to claim 9, wherein said providing step comprises providing a plate having a central cover portion, a flat flange axially spaced from said cover portion, and a skirt interconnecting an outer edge of said cover portion with an inner edge of said flange.

11. A method according to claim 10, wherein said providing step further comprises providing sharp outer edge at the junction of said cover portion and said skirt.

12. A method according to claim 9, wherein said positioning step includes seating said plate onto a frusto-conical centering projection projecting from a lower mold section of a two-piece injection mold having a horizontal parting face.

13. A method according to claim 9, wherein said providing step comprises providing a plate having a central cover portion, a flat flange axially spaced from said cover portion, a skirt interconnecting an outer edge of said cover portion and an inner edge of said flange, said cover portion including a concave outer surface, said positioning step further comprising engaging a planar surface of an upper mold section of a two-piece injection mold having a horizontal parting face against the outer edge of said concave surface.

* * * * *